United States Patent [19]
Fridez et al.

[11] Patent Number: 5,322,735
[45] Date of Patent: Jun. 21, 1994

[54] ROLLER BODY, METHOD OF ITS MANUFACTURE, AND OF ROLLER OR PLAIN BEARINGS

[75] Inventors: Jean-Daniel Fridez, Wohlenschwil; Georges W. Keller, Zofingen, both of Switzerland

[73] Assignee: Saphirwerk Industrieprodukte AG, Brugg, Switzerland

[21] Appl. No.: 117,558

[22] Filed: Sep. 7, 1993

Related U.S. Application Data
[63] Continuation of Ser. No. 672,658, Mar. 22, 1991, abandoned.

[30] Foreign Application Priority Data

Apr. 27, 1990 [CH] Switzerland .................... 1452/90

[51] Int. Cl.$^5$ ...................... B24D 11/00; B32B 19/00
[52] U.S. Cl. ...................... 428/357; 428/401; 428/402.24; 428/403; 428/698; 428/386; 384/445; 384/454; 384/455; 384/592; 384/618; 384/625; 51/307; 51/308; 51/309; 51/295
[58] Field of Search .............. 428/386, 401, 357, 698, 428/402.24, 423; 384/625, 618, 592, 454, 455, 445; 51/307, 308, 309, 295

[56] References Cited

U.S. PATENT DOCUMENTS
4,431,431 2/1984 Sarin et al. .......................... 428/404

FOREIGN PATENT DOCUMENTS
0196201 10/1986 European Pat. Off. .
0310042 4/1989 European Pat. Off. .
2378204 8/1978 France .
1589041 5/1981 United Kingdom .

*Primary Examiner*—Patrick J. Ryan
*Assistant Examiner*—Richard C. Weisberger
*Attorney, Agent, or Firm*—Shoemaker and Mattare, Ltd.

[57] ABSTRACT

A roller body or plain bearing component exhibits a core body (1) of ceramic material which is coated with a lapped hard layer (3) (e.g. titanium carbide, Diamond ...).

6 Claims, 2 Drawing Sheets

ROLLER BODY, METHOD OF ITS MANUFACTURE, AND OF ROLLER OR PLAIN BEARINGS

This application is a continuation of application Ser. No. 07/672,658, filed Mar. 22, 1991, now abandoned.

The invention concerns a roller body for a roller bearing or a plain bearing (e.g. a ball for a ball bearing) as well as a method of manufacture of a roller body or plain bearing component, as well as a roller bearing or plain bearing.

Ceramic materials, in particular so-called "Engineering Ceramics" or "Structural Ceramics", have been known and have been in use for many years. Mainly aluminium oxide $Al_2O_3$, zirconium oxide $ZrO_2$, silicon carbide SiC, silicon nitride/Sialon $Si_3N_4$ and similar compositions, are included in these materials, which are finding increasing practical use. Examples of such materials have been described, for example, in the following publications:

"Technische Keramik" G. Willmann, B. Wielage VULKAN VERLAG, Essen, 1988

"Handbook and Properties of Technical and Engineering Ceramics" R. Morrell, National Physical laboratory Her Majesty's Stationary Office, London, 1985

"Engineering Ceramic Materials", especially silicon nitride $Si_3N_4$, distinguish themselves from metallic materials through their specifically high temperature resistance, high hardness, high form stability (high modulus of elasticity) and excellent corrosion resistance. Unfortunately, in unlubricated operations, these materials demonstrate relatively high friction and wear (see, for example, "Friction and Wear Characteristics of Engineering Ceramics in Unlubricated Operation" M. Woydt SWISS MATERIALS 1 (1989) Page 19). Roller bodies from ceramic materials, mainly silicon nitride balls, nowadays have numerous high technology applications in ball-bearing technology.

Another known technique for the manufacture of high rigidity, running roller bodies comprises the coating of steel bodies or hard metal bodies with a hard layer (e.g. titanium carbide TiC). The application of the titanium carbide layer is done in a known way by means of CVD (Chemical Vapor Deposition) or by means of PVD (Physical Vapor Deposition) methods. Roller bodies with high strength, longevity, corrosion resistance and good tribologic properties due to their high surface quality can be manufactured with such methods ("Ball bearing with CVD-TiC coated components". H. Bowing, H. E. Hintermann, W. Hänni, Page 155 in "Proceedings of the 3rd European Space Mechanisms and Tribology Symposium", Madrid, Spain, Sep. 30–Oct. 2, 1987).

Indeed, it has likewise been known for a long time that the coating of steel and hard metal tools with titanium carbide TiC, titanium nitride TiN and titanium carbonitride TiCN results in especially good cutting properties and wear resistance of the cutting edges, but a use of these coating techniques has been in no way associated with roller bodies ("PVD and CVD coated hard metal tools in comparison" D. T. Quinto, E. Valerius, Page 109 in "Proceedings of New Coating Technology COAT TECH 89, DEMAT EXPOSITION MANAGING, Frankfurt, 1989: "Manufacture, Properties and Use of Plasma-Chemically deposited CVD diamond layers", K. V. Ravi, J. M. Pinneo. Page 385 in Proceedings of New Coating Technology COAT TECH 89, DEMAT EXPOSITION MANAGING, Frankfurt, 1989).

To summarize, the present day roller bearing bodies are:

Steel roller bodies for conventional use

TiC-steel roller bodies for use with high longevity

TiC-hard metal roller bodies for use at medium temperatures ($\sim 700°$ C.)

$Si_3N_4$ roller bodies for use at high temperatures ($\sim 1000°$ C.) and at high speeds.

Present day plain bearings, partly lubricated in accordance with plain bearing operating conditions, contain components of steel, brass/bronze or plastic (e.g. Teflon, Polyamide) which are lubricated or self lubricating through enhancement of the surface with a self lubrication layer (e.g. of a mixture of bronze, Teflon and lead). Lubrication mediums are normally oil or grease for low temperatures or molybdenum bisulphide $MoS_2$ or graphite for high temperatures.

The invention serves the purpose of improving mainly known roller bodies and plain bearings, especially with regard to their tribological properties (low friction and high wear resistance) and further improving their possibilities of application at high temperatures.

According to the invention, it has been found that the properties of roller bodies and plain bearing components made from ceramic materials with a density of less than 6,5 and a hardness of at least 1000 Vickers, especially materials from silicon nitride, permit very definite improvements through a hard, mainly lapped layer according to the invention (with or without an adhesion layer). This is due mainly to the choice and combination of the recommended surface structures, according to the invention, with the properties of ceramic materials (high strength, flexural strength $>300$ MPa, high temperature resistance up to $1000°$ C., mainly low density of between approximately 3 to 6,5 g/cm3 and slight thermal expansion of 3,0 to $10 \times 10^{-6}/°$ K.) in combination with hard layers (high hardness of $>2000$ Vickers, high strength, also at high temperatures (up to $800°$ C.), low friction and low wear). This allows manufacture of optimal roller bodies and plain bearing bodies. The combination of both materials, combined with a surface quality Ra according to the Patent claims, leads to higher longevity, also with the greatest loading. With that, improved roller bearings and plain bearings for special applications are able to be manufactured, (e.g dry running operation at high temperatures).

Especially good results can be aimed for if the adhesion layer is of titanium nitride TiN or titanium carbonitride TiCN for a core body of silicon nitride $Si_3N_4$, and the coating comprises titanium carbide.

If the layer comprises a diamond material (amorphous or polycrystalline), then titanium nitride TiN titanium carbide TiC or titanium carbonitride TiCN are suitable as an adhesion layer for a silicon nitride $Si_3N_4$ core body.

The titanium nitride, titanium carbide or titanium carbonitride layers permit good application using CVD or PVD methods The preferable layer thickness is 1–10 $\mu$m, according to the invention.

Diamond layers permit application by "Hot Filament CVD", "Microwave Plasma Activated CVD", "Electron assisted CVD" and "Plasma Activated CVD". The preferable layer thickness is 1–10 $\mu$m, according to the invention.

Optimal roller bodies and plain bearing components can be manufactured if the core body comprises high-strength silicon nitride Si$_3$N$_4$ (Hot Pressed or Hot Isostatic Pressed Silicon Nitride).

The running properties of these roller bodies or plain bearing components are particularly good if the finished layer of the body exhibits a roughness of <0,01 μm. A comparison of the roughness value Ra with "Microinch"—values can be found on page 157 of the previously mentioned document "Ball bearings with CVD-TiC coated components". Hard coated roller bodies and plain bearing bodies with low roughness exhibit the lowest wear and slightest friction.

Mainly, precise lapping until achievement of a surface quality Ra of 0,01 μm will lead to the manufacture of high quality roller bodies or plain bearing components. As a result of present day experience, the coefficients of friction between hard lapped surfaces such as TiC, TiCN or diamond applied to a core body and a steel component lie in the region of 0,05-0,3 in unlubricated operation.

BRIEF DESCRIPTION OF THE DRAWINGS

The invention is more closely described in the following description, and the accompanying drawings, wherein FIG. 1. A ball with the features of the invention.

DESCRIPTION OF THE PREFERRED EMBODIMENT

Figure 1:
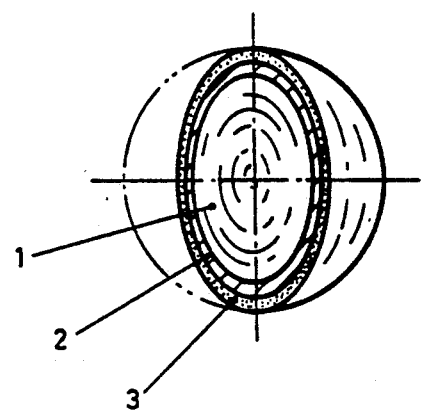

The ball according to FIG. 1 comprises a core body 1 made from high-strength silicon nitride Si$_3$N$_4$. The core body is ground and lapped before coating until a roundness of ~0.1 μm and a surface quality Ra of 0.01 μm is achieved. A thin titanium nitride TiN layer of approximately 0.5 μm thickness is applied as an adhesion layer 2 between the hard layer and the core body. The hard layer 3 of titanium carbide TiC with a thickness of approximately 0.5 μm is located upon this adhesion layer. This layer 3 exhibits a surface quality Ra of approximately 0.01 μm and the roundness of the entire coated ball (1-10 mm diameter) is about 0.1 μm. The ball is ideally suited for high technology ball bearings with high load carrying capacity, also in dry running operation.

Figure 2:
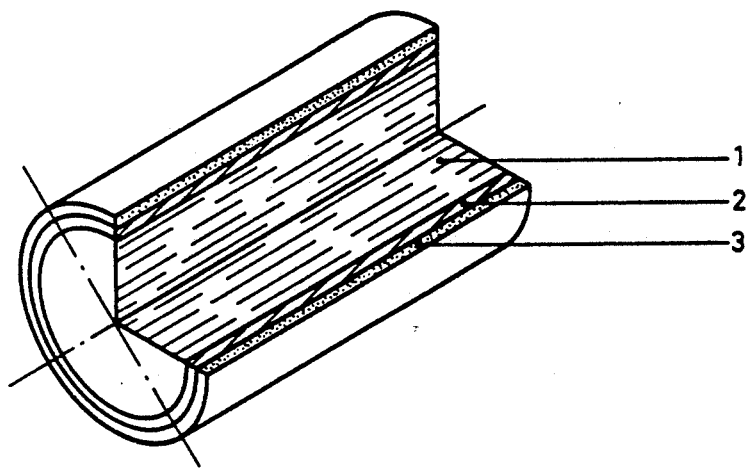
FIG. 2 is an oblique sectional view of. A roller body embodying the invention, FIG. 3. is a schematic representation of a ball in a ball bearing race, FIG. 4. is an oblique view in partial section, of a plain bearing comprising a sleeve and a hard, coated cylindrical body.

FIG. 2 shows a cylindrical roller body with a SiALON-silicon nitride core body 1, a titanium carbonitride TiCN adhesion layer 2 (layer thickness ~0,5 μm) and an outer layer 3 of titanium carbide (layer thickness ~5 μm). This layer 3 possesses a surface quality Ra of 0,01 μm and the roundness of the entire cylinder (3-10 mm diameter) is approximately 0,5 μm. This roller body is suitable mainly for bearings exposed to high temperatures and/or for dry running operation.

Figure 3:
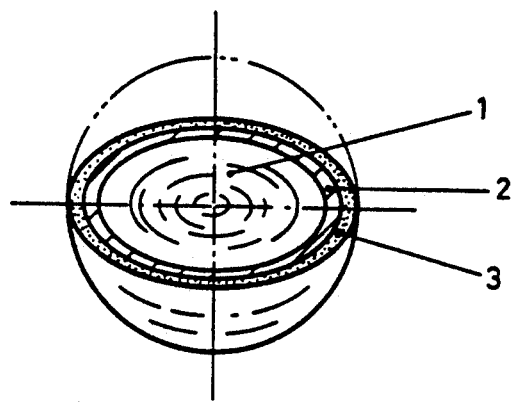

FIG. 3 shows an embodiment of a ball with a core body 1 of silicon nitride Si$_3$N$_4$, an adhesion layer 2 of titanium nitride TiN+titanium carbide TiC (layer thickness ~1 um) and an outer layer 3 of diamond material applied by CVD methods (layer thickness ~2 μm). This layer 3 exhibits a surface quality Ra of 0,01 μm, and the roundness of the coated ball (diameter 1 mm) is 0,1 μm. Such diamond coated balls are particularly suitable for ball bearing applications in dry running operations.

Figure 4:
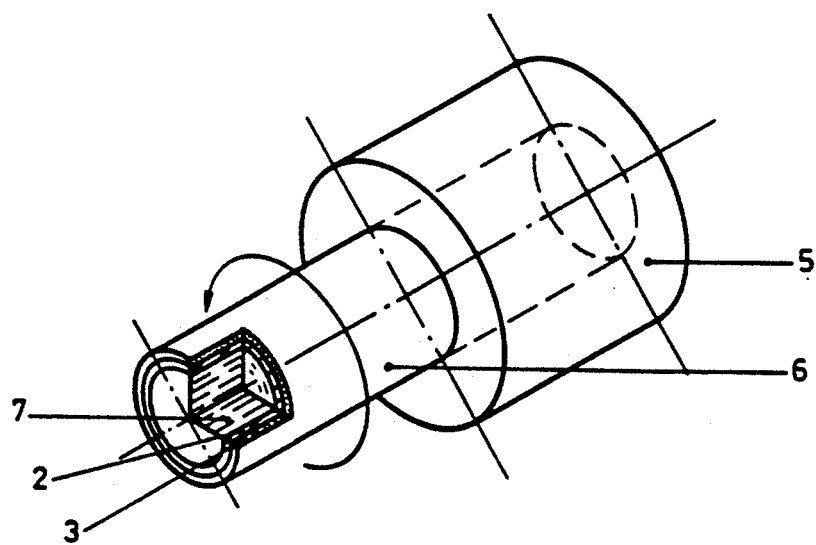

FIG. 4 shows a plain bearing with a steel sleeve 5 and a layered cylindrical body 6 comprising a silicon nitride Si$_3$N$_4$ core body 7, coated with a titanium nitride adhesion layer 2 and a titanium carbide layer 3. The surface quality and dimensional data correspond to the data of the cylinder depicted in FIG. 2. Such plain bearings are intended for dry running operations and high rotational speeds.

In the case of the roller bodies according to the invention, in general not only an increase in hardness, but also mainly a reduction in friction coefficients and an increase in surface homogeneity can be established.

In the case of the roller bodies and bearing components described, manufactured roller bearings or plain bearings demonstrate higher load carrying capacity, greater longevity and better dry running characteristics.

We claim:

1. A roller body for a bearing, said body comprising a core of ceramic material consisting essentially of silicon nitride (Si$_3$N$_4$) with a density of less than 6.5 and a hardness of at least 1000 Vickers, said core having a surface quality Ra of 0.1 to 1.0 μm, and a roundness of 0.1 to 1.0 μm, said body further comprising an outer coating comprising titanium nitride (TiN), the coating's surface having a quality Ra of less than 0.025 μm.

2. A roller body according to claim 1, wherein said coating's thickness is in the range of 1 to 10 μm.

3. A roller body according to claim 2, wherein the coating's surface is polished with free abrasive particles to a surface quality Ra of approximately 0.01 μm.

4. A roller body according to claim 1, wherein the coating's surface is polished with free abrasive particles to a surface quality Ra of approximately 0.01 μm.

5. A bearing comprising a plurality of roller bodies according to claim 4.

6. A bearing comprising a plurality of roller bodies according to claim 1.

* * * * *